United States Patent [19]

von Bonin et al.

[11] Patent Number: 5,173,515

[45] Date of Patent: Dec. 22, 1992

[54] FIRE RETARDANT FOAMS COMPRISING EXPANDABLE GRAPHITE, AMINE SALTS AND PHOSPHOROUS POLYOLS

[75] Inventors: Wulf von Bonin, Odenthal; Dietmar Schäpel, Cologne, both of Fed. Rep. of Germany

[73] Assignee: Bayer Aktiengesellschaft, Leverkusen, Fed. Rep. of Germany

[21] Appl. No.: 521,789

[22] Filed: May 10, 1990

[30] Foreign Application Priority Data

May 30, 1989 [DE] Fed. Rep. of Germany ....... 3917518

[51] Int. Cl.$^5$ .............................................. C08G 18/28
[52] U.S. Cl. .................................. 521/103; 521/105; 521/107; 521/121; 521/128; 521/129; 521/165; 521/168; 521/169; 521/906; 521/907
[58] Field of Search ................... 521/55, 65, 103, 107, 521/165, 168, 169, 906, 907, 105, 121, 128, 129

[56] References Cited

U.S. PATENT DOCUMENTS

| | | | |
|---|---|---|---|
| 4,694,030 | 9/1987 | von Bonin et al. | 521/82 |
| 4,698,369 | 10/1987 | Bell | 521/99 |
| 4,722,945 | 2/1988 | Wood et al. | 521/54 |
| 4,945,015 | 7/1990 | Milner et al. | 521/82 |
| 5,023,280 | 6/1991 | Haas et al. | 521/99 |

*Primary Examiner*—Maurice J. Welsh
*Assistant Examiner*—Rachel Johnson
*Attorney, Agent, or Firm*—Sprung Horn Kramer & Woods

[57] ABSTRACT

New particularly effective fire retardent elements based on foams and expandable graphite are characterized in that they additionally contain one or more components from the group consisting of phosphate-containing polyols, borates and amine salts.

12 Claims, No Drawings

FIRE RETARDANT FOAMS COMPRISING EXPANDABLE GRAPHITE, AMINE SALTS AND PHOSPHOROUS POLYOLS

The present invention relates to fire retardant elements based on foams containing expanded graphite and at least one further component and to their use as construction materials.

The previously customary fire retardant elements based on foams have considerable drawbacks. They release chlorine-containing gases in the event of a fire, they shrink considerably when heated, result in intumescent foams which have insufficient resistance to flame erosion, melt and drip or slide away from the site of application when exposed to flames and/or have a pressure of expansion which is too low. All these properties are undesirable. In case of fire, it should be ensured in particular that, for example, door joints are efficiently sealed.

EP-B1 0,009,109 discloses a thermally expandable sealing material for joints, cavities or the like, a woven or nonwoven being coated with a mixture of expanded graphite, polychloroprene, alkylphenol-formaldehyde resin and stabilizers. The disadvantage of this material is in particular that it releases chlorine-containing gases in the event of a fire.

GB-A 2,168,706 discloses a fire retardant polyurethane foam which contains expanded graphite. This material is described as being usable for fire retardant upholstery and as having passed the appropriate tests. Since the requirements of fire retardant elements with respect to weight per unit volume, in particular in terms of mechanics and behaviour in fire tests, are significantly higher, it could not have been expected that the combination foam/expanded graphite in combination with other materials could also be suitable as fire retardant elements.

Fire retardant elements based on foams containing expandable graphite and, if necessary, customary additives and which are characterized in that they additionally contain one or more components from the group consisting of phosphorus-containing polyols, borates and amine salts have now been found. Furthermore, it was found that this type of fire retardant elements can be used as construction material.

Examples of suitable foams are organic or inorganic foams having closed or open-pored cavities but also nonwovens and cotton wool made of organic or inorganic materials and also shaped mineral wool articles. Examples of base materials for foams, nonwovens or cotton wool are: gypsum, waterglass, cellulose, polyolefins, polyalkylene oxides, formaldehyde resins such as phenol-, urea-, melamine- and/or dicyandiamide-formaldehyde resins, polyvinyl halides, polyvinyl aromatics, polyamides, polyacrylates, diene polymers, polyphosphazene, silicones and in particular polyurethanes. These materials can be made into foams, nonwovens or cotton wool in a manner known per se. For example, foams can be obtained by converting an initially liquid multi-component mixture into a foam or by beating latex foams until foamed followed by curing or coagulation. The foams can also already have been given a fire retardant finish in the usual manner and/or contain customary fire retardant additives, customary other fillers and/or customary auxiliaries. This type of additives and fillers can be present, for example, in fibre, globule, hollow globule, powder or pellet form. Examples are aluminium hydroxide, vermiculite, polyammonium phosphate, magnesium hydroxide, glass powder, glass globules, microglass hollow globules, calcium cyanamide, calcium carbonate and/or aluminosilicates.

Polyurethane foams which are preferred for the fire retardant elements according to the invention can be manufactured, for example, from conventional polyisocyanates and customary polyols, if necessary, in combination with the use of customary auxiliaries. Examples of suitable polyols are aliphatic, cycloaliphatic, araliphatic, aromatic and/or heterocyclic polyisocyanates, such as are described, for example, by W. Siefken in Justus Liebigs Annalen der Chemie, 562, pages 75 to 136, for example those of the formula

$$Q(NCO)_n$$

in which
n is 2–4, preferably 2, and
Q is
    an aliphatic hydrocarbon radical having 2–18, preferably 6–10 C atoms,
    a cycloaliphatic hydrocarbon radical having 4–15, preferably 5–10 C atoms,
    an aromatic hydrocarbon radical having 6–15, preferably 6–13 C atoms,
    or an araliphatic hydrocarbon radical having 8–15, preferably 8–13 C atoms.

Preference is given to the technically easily accessible polyisocyanates, for example 2,4- and 2,6-toluylene diisocyanate, and any desired mixtures of these isomers ("TDI"), in particular polyphenyl-polymethylene polyisocyanates, such as are prepared by aniline-formaldehyde condensation followed by phosgenation ("crude MDI") and polyisocyanates which contain carbodiimide groups, urethane groups, allophanate groups, isocyanurate groups, urea groups and/or biuret groups ("modified polyisocyanates"), in particular those modified polyisocyanates which are derived from 2,4- and/or 2,6-toluylene diisocyanate or from 4,4'- and/or 2,4'-diphenylmethane diisocyanate.

Examples of suitable polyols are those which have a molecular weight of 400 to 10,000, in particular polyesters and polyethers having 2 to 8 hydroxyl groups. Examples of suitable hydroxyl-containing polyesters are reaction products of polyhydric, preferably dihydric and, if desired, additionally trihydric, alcohols with polyhydric, preferably dihydric, carboxylic acids. Instead of the free polycarboxylic acids, the corresponding polycarboxylic anhydrides or the corresponding polycarboxylic esters of lower alcohols or their mixtures may also have been used for preparing the polyesters.

Suitable polyethers, which have at least 2, usually 2 to 8, preferably 2 to 3, hydroxyl groups may have been prepared, for example, by polymerization of epoxides such as ethylene oxide, propylene oxide, butylene oxide, tetrahydrofuran, styrene oxide or epichlorohydrin with themselves or by the addition reaction of these epoxides with starting components having reactive hydrogen atoms such as water, alcohols, ammonia or amines.

Suitable polyols are additionally also those having a molecular weight of 32 to 400, which then serve as chain-lengthening agent or crosslinking agent. These compounds can, for example, have 2 to 8, preferably 2 to 4, hydrogen atoms which are reactive towards isocyanates. Examples of this type of compounds are ethylene glycol, propylene 1,2-glycol, propylene 1,3- glycol, butylene 1,4-glycol, butylene 2,3-glycol, pentane-1,5-diol, hexane-1,6-diol, octane-1,8-diol, neopentyl glycol, glycerol, trimethylolpropane, addition products of trimethylolpropane with 1 to 5 moles ethylene oxide, hexane-1,2,6-triol, trimethylolethane, pentaerythritol, mannitol, diethylene glycol, triethylene glycol, tetraethylene glycol and higher polyethylene glycols having a molecular weight of up to 400.

Examples of suitable expandable graphites are known intercalation compounds of $SO_x$, $NO_x$, halogen and/or strong acids in graphite. These are also called graphite salts. Preference is given to expandable graphites which at temperatures of, for example, 120° to 350° C. release $SO_2$, $SO_3$, NO and/or $NO_2$ with expansion. The expandable graphite can be present, for example, in the form of pellets having a maximum diameter in the range from 0.1 to 5 mm. Preferably, this diameter is in the range of 0.5 to 3 mm. Expandable graphites which are suitable for the present invention are commercially available.

In general, the expandable graphite particles are evenly distributed in the fire retardant elements according to the invention. However, the concentration of expandable graphite particles can also vary and can also be present in point, pattern, sheet and/or sandwich form.

Relative to the ready-for-use fire retardant element, for example 1 to 50% by weight of expandable graphite can be contained therein. Preferably, this expandable graphite content is 2 to 20% by weight in particular 2 to 10% by weight.

The weight per unit volume of the fire retardant elements according to the invention can be, for example, in the range from 100 to 1000 kg/m³. Preferably, it is 150 to 600 kg/m³.

It is an essential feature of the fire retardant elements according to the invention that they contain expandable graphite in combination with one or more components from the group consisting of phosphorus-containing polyols, borates and amine salts. Examples of suitable phosphorus-containing polyols are phosphorus-containing condensation products having hydroxyl groups, such as can be obtained, for example, by condensation of OH-containing or OH-free primary or secondary aliphatic, cycloaliphatic, aromatic, araliphatic or heterocyclic mono-and/or polyamines, carbonyl compounds and dialkyl phosphites, if necessary, followed by alkoxylations. These types of condensation products are known per se, for example from German Patent Specification 1,143,022, U.S. Pat. No. 3,076,010, DE-AS (German Published Specification) 1,803,747 and DE-AS (German Published Specification) 1,928,256. Preference is given to phosphorus-containing condensation products containing at least two hydroxyl groups and having the formula

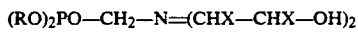
$(RO)_2PO-CH_2-N=(CHX-CHX-OH)_2$ in which

R represents $C_1$-$C_8$-alkyl or $C_1$-$C_8$-hydroxyalkyl, preferably ethyl or hydroxyethyl, and X enotes hydrogen or methyl, preferably hydrogen.

Examples of suitable borates are borates in salt form, in particular calcium, magnesium and zinc borates. Preference is given to calcium- and magnesium-containing boron minerals, in particular colemanite.

Suitable amine salts are salts of amines and acids, in particular melamine salts such as melamine phosphate, dimelamine phosphate, melamine diphosphate, melamine borate, melamine phthalate, melamine oxalate, melamine cyanurate and melamine sulphate. It is not always necessary for the salt formation to have taken place with stoichiometric amounts of amine and acid, for example reaction products of 1 mole of melamine with 0.5 to 1 mole of acid (e.g. orthophosphoric acid) or mixtures of melamine and melamine salts can also be used. Furthermore, it is, for example, possible to use ethylenediamine salts, such as ethylenediamine phosphates. The ethylenediamine phosphates can also be, for example, salts, mixed salts with other cations and/or partial salts of ethylenediamine with acids of phosphorus such as orthophosphoric, metaphosphoric, pyrophosphoric or polyphosphoric acid, phosphorous acid, phosphonic acids, phosphinic acids, acidic esters, acidic partial esters and amides of phosphoric acid. Of particular interest is the neutralization product of ethylenediamine with orthophosphoric acid, which can easily be prepared by combining the components in aqueous medium and subsequent evaporation. Combinations of ethylenediamine phosphate and melamine and/or melamine phosphate can also be used, for example those which contain 100 to 20, preferably 70 to 30, % by weight of ethylenediamine phosphate. A preferred amine salt is melamine phosphate.

The particle size of the borates and the amine salts can be, for example, in the range of 0.1 to 500 μm.

Based on the fire retardant element according to the invention, for example, 2 to 30% by weight of phosphorus-containing polyols, 0 to 30% by weight of borates and/or 2 to 30% by weight of amine salts can be contained therein, the sum of these 3 components being, for example, not more than 50% by weight.

Fire retardant elements according to the invention can be prepared, for example, by adding expandable graphite and phosphorus-containing polyol and/or borate and/or amine salt to the reaction mixture for the preparation of the particular foam or a component thereof. These components, which are essential to the invention, can also be added to latex dispersions, which are then beaten until foamed and cured or coagulated. The components essential to the invention can also be used, for example, in an aqueous dispersion for the impregnation or soaking of already prepared foams. The shaping of the fire retardant elements according to the invention can be adapted to the particular application purpose and does not present any difficulties for one skilled in the art, since they are known in principle in the technical field of foams.

Fire retardant elements according to the invention can be used, for example, for the sealing of joints, cavities, wall ducts, pipe ducts, but also for the covering of any desired objects. They may have stretching and cushioning functions, but in particular sealing functions against heat and gases from a fire, which are maintained for an extended period of time even upon exposure to flames. They can be commercialized and used in any desired form, for example as flakes, granules, spheres, strip profiles, tubular profiles, grids, plugs, panels, square blocks, pyramids, half shells, hollow bodies, sleeves, foam sheets or any other desired shaped article. Fire retardant elements according to the invention can, if desired, have holes, parting cracks or foldings. If desired, they can be put together in situ in any desired manner, for example also in the form of jigsaws or loose bulk material, if necessary with the use of adhesives; if it is desired, they can also be manufactured in situ.

Fire retardant elements according to the invention can also be combined with other fire retardant materials and can be used by themselves or together with other fire retardant materials as construction materials or can be part of construction elements. Examples of suitable construction elements are: sealing elements, profiled gaskets, walls, panels, sleeves, cable partitions, pipe partitions, beams, columns and false ceilings. Fire retardant elements according to the invention can be hard, flexible, elastic or soft.

Fire retardant elements according to the invention can be used as construction material, for example, in the construction of cars, ships, wagons, airplanes, equipment, and in the manufacture of furniture, but also in plant construction, building construction and civil engineering and in interior design.

Suitable use examples are as follows:

Mats for sheeting or covering cable routes, air-conditioning ducts and wood and steel constructions, coatings of wall and ceiling elements, of rockwool mats for partitions, of fabrics for joint seals and casings of electronic equipment, cords and profiles for joint seals in building and equipment construction, half shells for sheathing cables, pipes or steel strut bracings in building construction, strips in door frames and windows, granules and panels for filling cavities in double-walled walls in the construction of buildings, wagons and cars, granules and foam panels for filling fire retardant doors, blocks, panels, mats and plugs for cable ducts (bulkheads) in building and ship construction, wrappings and sleeve inserts for pipe ducts (partitions), coatings on seats or armrests in the construction of cars and wagons and in the manufacture of furniture, two-component reaction mixtures for filling cable and pipe ducts, ventilation grates in building construction which close upon heating, soundproofing elements in the form of contoured panels and coated metal sheets and panels for fire retardant purposes.

In the case of fire, the fire retardant elements according to the invention are distinguished in particular by the formation of a solid carbon foam structure, low flame erosion, low smoke density, rapid extinguishing effect and by the fact that surprisingly material which starts melting does not drip or slide away. Furthermore, the fire retardant elements according to the invention have the advantage that they can be handled dust-free during manufacture, finishing and assembly.

In the examples below, parts and percentages are by weight, unless stated otherwise.

EXAMPLES

Characterization of some of the more frequently used substances in the examples:

Polyisocyanate A

Polymethylene-polyphenyl-polyisocyanate obtained from a crude phosgenation product of an aniline/formaldehyde condensation product by distilling off such an amount of diisocyanatodiphenylmethane that the distillation residue at 25° C. has a viscosity of 100 cP (content of binuclear components: 59.7%; amount of trinuclear components: 21.3%; amount of polynuclear polyisocyanates: 19.0%).

Polyisocyanate B

Polymethylene-polyphenyl-polyisocyanate obtained as described under polyisocyanate A, except that diisocyanatodiphenylmethane was distilled off until the distillation residue at 25° C. had a viscosity of 400 cP (amount of binuclear components: 45.1%; amount of trinuclear components: 22.3%; amount of polynuclear polyisocyanates: 32.6%).

Polyol 1

Polyether-polyol obtained by the addition reaction of 45% of propylene oxide and 55% of ethylene oxide with trimethylolpropane and having an OH number of 56.

Polyol 2

Polyether-polyol obtained by the addition reaction of 83% of propylene oxide and 17% of ethylene oxide with trimethylolpropane and having an OH number of 36.

Polyol 3

Polyether-polyol obtained by the addition reaction of ethylene oxide with trimethylolpropane and having an OH number of 550.

Polyol 4

Polyether-polyol obtained by the addition reaction of 5% of propylene oxide and 95% of ethylene oxide with glycerol and having an OH number of 250.

Phosphorus Diol P

Technical grade phosphorus-containing condensation product having the idealized structure:

$(C_2H_5O)_2POCH_2N(C_2H_4OH)_2$.

Red iron oxide pigment

Bayferrox ® M318, Bayer AG.

Activator 1

Permethylated diethylenetriamine.

Activator 2

Tin(II) dioctoate.

Glycerol ester G

Esters of glycerol with fatty acids of the structure $$\begin{array}{l}CH_2-COO-C_7H_{15}\\ |\\ CH-COO-C_9H_{19}\\ |\\ CH_2-COO-C_7H_{15}.\end{array}$$

Expandable graphite

Graphite expanding in the heat with the release of sulphur oxides. A powder consisting of pellet-like particles, 90% of which have a diameter below 0.5 mm. Commercially available from Sigri under the name Sigraflex ® FR 90-60/80.

Colemanite

A calcium borate mineral of the idealized empirical formula $Ca_2B_6O_{11} \cdot 5H_2O$.

Example 1

100 parts of polyol 4, 60 parts of phosphorus diol P, 2 parts of red iron oxide pigment, 15 parts of aluminium hydroxide, 50 parts of melamine phosphate, 1 part of water and 20 parts of expanded graphite were stirred with 100 parts of a polyisocyanate (Desmodur ® 44 V 20, Bayer AG) in a mould which resulted in a conical plug. The inherent water content led to a foam having a weight per unit volume of 210 kg/m³ which was soft-flexible. In a material specimen prepared analogously, the expanded graphite was replaced by talc.

Both foam plugs were placed with their flat side on a slightly inclined metal sheet heated to 500° C. The talc-containing plug started to slide down the inclined metal sheet with foaming and melting, while the plug which contains expandable graphite remained in place with foaming and did not slide down.

This test shows that the foam which is designed to be inherently fire retardant by the addition of talc melts away upon exposure to flames, while the addition of expanded graphite prevents the melting away upon exposure to flames. This effect is particularly important if the seal elements lie on smooth surfaces, e.g. metal surfaces.

Example 2

75 parts of polyol 1 and 30 parts of phosphorus diol P, 5 parts of expanded graphite, 10 parts of colemanite powder, 0.6 part of water, 0.7 part of activator 1 and 0.4 part of glycerol ester G were thoroughly mixed with one another. 47 parts of the polyisocyanate B were added to this mixture, which was then stirred until it was homogeneous. This reaction mixture was poured into a mould having the dimensions 10×20×5 cm and allowed to foam freely. The foam height was on average 4.2 cm, which corresponds to a weight per unit volume of 190 kg/m³. The soft-elastic foam block obtained was converted to a square block by cutting off the convex surface. This type of foam parts in the form of square blocks is highly suitable for sealing cable ducts in the walls of buildings. This was tested in a small oven (in a way similar to that in DIN 4102) in the following manner:

A porous concrete block of the dimensions 50×50×20 cm was given an opening in the middle of 30×30 cm. A solidly fastened bundle of 10 electric cables (type NYM-J 4×6, PVC cable sheathing, diameter per cable 15 mm) was placed through this opening on the bottom side of the opening in such a manner that a cable length of 25 cm protruded towards the side to be exposed to the flame. The total length of the bundle of cables was 70 cm. The entire remaining volume was filled with foam square blocks in such a manner that the individual square blocks were arranged in layers and pressed together to give a joint-free seal of the opening. The cable partition pattern thus obtained was installed in an opening of the appropriate size in the side of the small firing oven and exposed to a flame for 90 minutes, in which the flame corresponded to the unit temperature/time curve according to DIN 4102. After a 90-minute exposure to the flame, the cable partition was still impermeable. The temperatures on the outside of the partition were: 70° C. on the square blocks and 150° C. on the cable sheathings.

Examples 3 to 11

Further fire retardant elements according to the invention were produced analogously to the procedure of Example 2. The mixing components are listed in Table 1 below.

TABLE

| Example Number | (Numerical data in parts by weight): | | | | | | | | |
|---|---|---|---|---|---|---|---|---|---|
| | 3 | 4 | 5 | 6 | 7 | 8 | 9 | 10 | 11 |
| Polyol 1 | 70 | — | — | — | 100 | 50 | 80 | 70 | — |
| Polyol 2 | — | 100 | 100 | 100 | — | 30 | — | — | 100 |
| Polyol 3 | — | — | — | — | — | 20 | 20 | — | 14 |
| Polyol 4 | — | — | — | — | — | — | — | 30 | — |
| Butane-1,4-diol | — | 6 | 6 | 6 | 6 | — | — | — | 4 |
| Expandable graphite | 5 | 7 | 7 | 7 | 10 | 4 | 7 | 5 | 10 |
| Colemanite | 30 | 40 | 40 | 40 | 10 | 30 | 13 | 5 | 10 |
| Phosphorus diol P | 30 | — | 8 | 6 | — | — | — | — | — |
| Water | 0.6 | 0.7 | 0.6 | 0.8 | 1 | 1.6 | 0.7 | 1 | 1 |
| Activator 1 | 0.5 | 0.2 | 0.2 | 0.2 | 0.2 | 0.3 | 0.1 | 0.2 | 0.2 |
| Activator 2 | — | 0.5 | 0.5 | 0.3 | 0.4 | — | 0.2 | 0.2 | 0.4 |
| Glycerol ester G | 0.3 | 0.4 | 0.4 | 0.5 | — | — | 1 | — | — |
| Polyisocyanate A | — | 38 | 44 | 46 | — | — | — | — | — |
| Polyisocyanate B | 51 | — | — | — | 47 | 44 | 53 | 47 | 44 |
| Weight per unit volume (kg/m³) | 170 | 170 | 300 | 190 | 250 | 100 | 100 | 150 | 175 |

Examples 12 to 16

The following reaction mixtures were produced analogously to the procedure described in Example 2:

TABLE 2

| Example Number | 12 | 13 | 14 | 15 | 16*) |
|---|---|---|---|---|---|
| Polyol 2 | 200 | 200 | — | — | — |
| Polyol 3 | 16 | 16 | — | — | — |
| Polyol 4 | — | — | 132 | 132 | 132 |
| Expandable graphite | 14 | 14 | 21 | 21 | — |
| Colemanite | 120 | 120 | — | — | — |
| Phosphorus diol P | 16 | — | 79 | 79 | 79 |
| Aluminium hydroxide | — | — | 20 | 20 | 20 |
| Melamine phosphate | — | 20 | 66 | 66 | 66 |
| Red iron oxide pigment | 2 | 2 | 3 | 3 | 3 |
| Water | 1 | 1 | 1 | 1.2 | 1.2 |
| Activator 1 | 1 | 1 | — | — | — |
| Glycerol ester G | — | — | 0.5 | 0.5 | 0.5 |
| Polyisocyanate A | 72 | 54 | — | — | — |
| Polyisocyanate B | — | — | 120 | 120 | 120 |

*)Comparative Example

The reaction mixtures corresponding to Examples 12 to 16 were poured into an open round mould having a conical cross-section in each case in such an amount that the freely foaming mixture gave a soft-elastic plug whose height was 5 cm at the edge and 6 cm in the middle and whose bottom diameter was 16.5 cm and top diameter 17.5 cm.

To test the efficiency as fire retardant elements for sealing openings in ceilings (ceiling partitions), various moulded foam articles were produced in the form of plugs having the above dimensions. The bottom side of the plugs was prepared as indicated in Table 3, and the top side of the plugs was the foam film which was foamed in each case on the top side of the freely foaming reaction mixture.

The ceiling partition pattern was constructed in such a manner that 4 round openings were in each case cut into porous concrete slabs of dimensions 50×50×10 cm, each of the openings being sealed with 2 identical plugs. For the purpose of sealing the openings, the sides of the plugs were coated with a firmly adhesive fire retardant paste, resulting in a film thickness of 1 mm after evaporation of the water. The plugs were then slightly pressed together and pushed into the openings in such a manner that the bottom sides of the plugs were situated in the middle of the porous concrete slabs and the top sides of the plugs described above were exposed to the outside. In this manner, the entire volume of an opening in the porous concrete slab was filled out.

Each of these ceiling partition patterns was installed in an opening of appropriate size in the ceiling of the small firing oven (manufactured in a way similar to that in DIN 4102). The exposure to the flame was carried out in accordance with the unit temperature/time curve of DIN 4102 for 120 minutes. The fire breakthrough for the various plugs was determined. The results are summarized in Table 3.

TABLE 3

| Reaction mixture according to Example Number | Weight per unit volume of the plug foam kg/m³ | Bottom side of the plugs | Result of the exposure to the flame |
| --- | --- | --- | --- |
| 12 | 250 | untreated | after 95 min. fire breakthrough |
| 12 | 250 | 3 mm thick Fomox ® WMP layer | after 120 min. still no fire breakthrough |
| 12 | 250 | SiO₂ fabric 1,300 g/m² | after 120 min. still no fire breakthrough |
| 12 | 250 | glass fabric 400 g/m² | after 110 min. fire breakthrough |
| 13 | 250 | untreated | after 95 min. fire breakthrough |
| 14 | 305 | 3 mm thick Fomox ® WMP layer | after 120 min. still no fire breakthrough |
| 14 | 310 | untreated | after 120 min. still no fire breakthrough |
| 15 | 255 | 3 mm thick Fomox ® WMP layer | after 95 min. fire breakthrough |
| 15 | 260 | untreated | after 110 min. fire breakthrough |
| 16 (Comparative Example) | 260 | untreated | after 65 min. fire breakthrough |

Fomox ® WMP is a fire retardant paste from Bayer AG

Examples 16 to 18

The following reaction mixtures were produced analogously to the procedure described in Example 2:

TABLE 4

| Example Number | 16 | 17 | 18 |
| --- | --- | --- | --- |
| Polyol 2 | 200 | 200 | 200 |
| Butane-1,4-diol | 12 | 12 | 12 |
| Phosphorus diol P | 12 | — | 12 |
| Colemanite | 120 | 120 | 80 |
| Expandable graphite | 14 | 14 | 14 |
| Melamine phosphate | — | 20 | — |
| Water | 1.6 | 1.2 | 1.4 |
| Activator 1 | 0.6 | 2 | 0.4 |
| Activator 2 | 0.4 | — | 0.8 |
| Red iron oxide pigment | 2 | 2 | — |

TABLE 4-continued

| Example Number | 16 | 17 | 18 |
| --- | --- | --- | --- |
| Polyisocyanate A | 92 | 72 | 88 |

Each of the reaction mixtures was placed into a sealable mould having a cavity of 40×40×0.7 cm in such an amount that after the foaming and complete reaction of the mixture a foam slab having a weight per unit volume of 250 kg/m³ was obtained.

The flame retardant effect of these fire retardant elements, which are suitable as coatings on seat cushions was tested in a device according to British Standard BS 5852 Part 2. The fire retardant coating material obtained according to Example 18 was coated onto the 6.8 cm thick polyurethane foam mat of the seat frame. On top of this coating, the wooden frame Crib 5 to be exposed to the flame was placed at the predetermined position. Result of the exposure to the flame: 7 minutes after initiation of the flame, the flames had been extinguished. The weight loss caused by the fire was 27 g, and the diameter of the burned area of the fire retardant coating was 10 cm.

Example 19

A mixture of 100 parts of polyol 4, 60 parts of phosphorus diol P, 15 parts of aluminium hydroxide, 50 parts of melamine phosphate, 2 parts of red iron oxide pigment, 0.9 part of water, 0.4 part of glycerol ester G and 20 parts of expandable graphite were thoroughly mixed with 120 parts of the polyisocyanate B. The reaction mixture obtained was poured into an open mould having a base area of 10×20 cm and a height of 15 cm and allowed to foam freely. This gave a hard foam having a weight per unit volume of 200 kg/m³, which can be readily cut into panels. These types of foam panels are suitable as fire retardant filling and stiffening elements in fire retardant walls or in partition walls in the construction of houses and wagons.

Example 20

20 parts of cotton wool were thoroughly mixed with a mixture consisting of 3 parts of secondary ammonium phosphate and 2 parts expandable graphite. This gave cotton wool in which the additives are loosely embedded. This cotton wool was shaped to give a plug. This plug was used to seal a hole of 1.5 cm in diameter, which was situated in a brick. The hole thus sealed was exposed to the flame from a Bunsen burner along the direction of the axis. This caused some of the cotton wool to burn, but then a solid seal consisting of a mixture of carbonized cotton and expanded graphite was formed, which sealed the hole against flame breakthrough for more than 60 minutes. The test was repeated using cotton wool in which talc had been incorporated instead of expanded graphite. The seal in this case had burned through after less than 15 minutes.

What is claimed is:

1. A fire retardant element comprising a foam containing expandable graphite, one or more phosphorus-containing polyols, and one or more amine salts wherein the compounds are present in the following amounts; 2 to 30% by weight of phosphorus-containing polyols, and 2 to 30% by weight of amine salts, the total amounts of said polyols and amine salts comprising not more than 50% by weight of the total weight of the fire retardant element.

2. A fire retardant element of claim 1, in which the foam comprises a polyurethane.

3. A fire retardant element of claim 1, which has additionally been provided with a fire retardant finish.

4. A fire retardant element of claim 1, which additionally contains customary additives.

5. A fire retardant element of claim 1, which additionally contains customary fire retardant additives, customary other fillers and/or customary auxiliaries.

6. A fire retardant element of claim 1, in which the expandable graphite contained in it comprises intercalation compounds of $SO_x$, $NO_x$, halogen and/or strong acids in graphite.

7. A fire retardant element of claim 1, which contains 1 to 50% by weight of expandable graphite, relative to the ready-for-use fire retardant element.

8. A process for the production of a fire retardant element comprising a foam, in which an expandable graphite and a phosphorus-containing polyol and an amine salt are added to the reaction mixture for the preparation of the particular foam.

9. A process for the production of a fire retardant element comprising a foam, in which an expandable graphite and a phosphorus-containing polyol and an amine salt are added to a component for the preparation of the particular foam.

10. A fire retardant element of claim 1 additionally comprising one or more borates, wherein the total amount of said polyols, amine salts and borates comprises not more than 50% by weight of the total weight of the fire retardant element.

11. The process of claim 8, wherein a borate is also added to the reaction mixture.

12. The process of claim 9, wherein a borate is also added to the reaction mixture.

* * * * *